No. 747,844. Patented December 22, 1903.

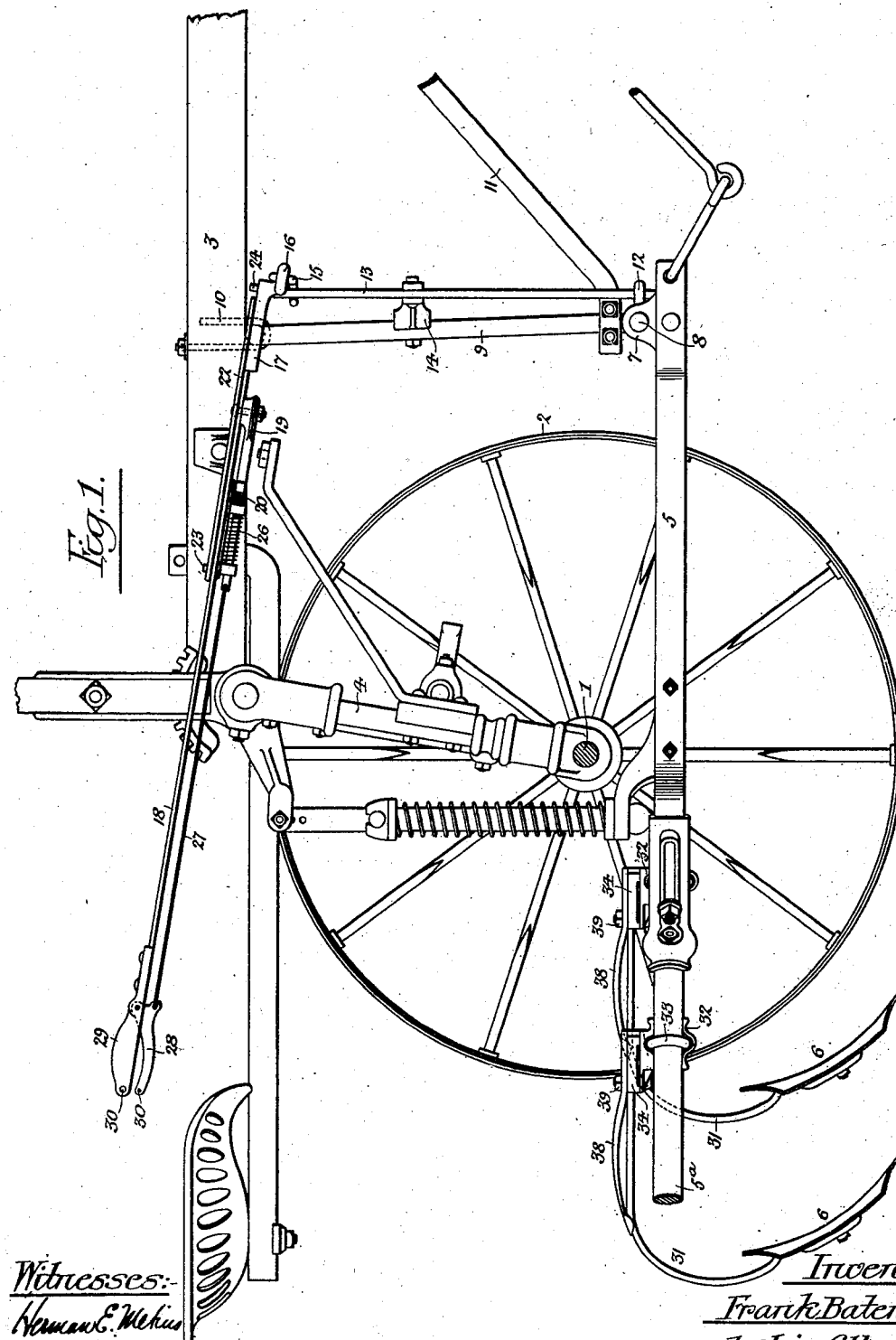

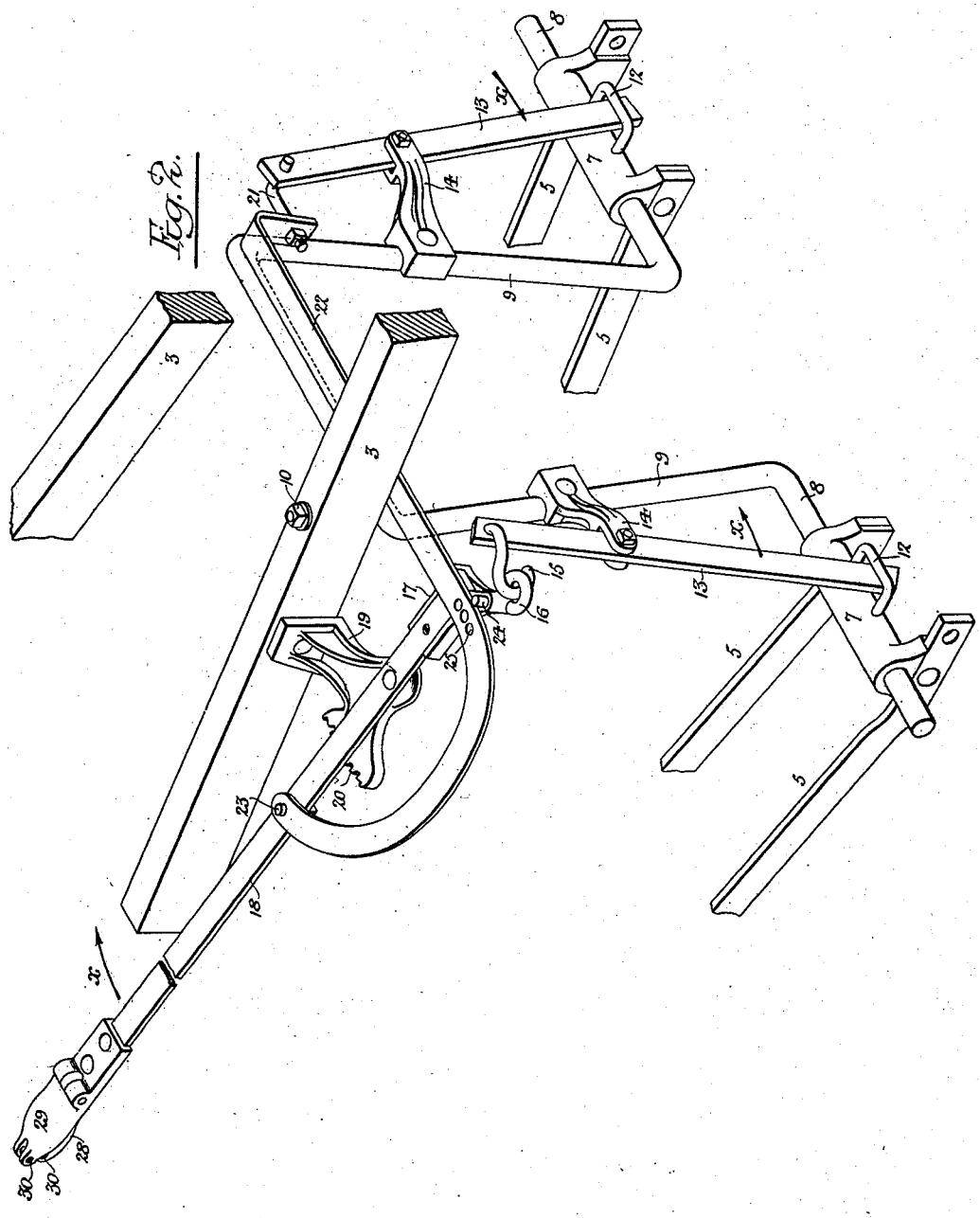

UNITED STATES PATENT OFFICE.

FRANK BATEMAN, OF GRENLOCH, NEW JERSEY.

CULTIVATOR.

SPECIFICATION forming part of Letters Patent No. 747,844, dated December 22, 1903.

Application filed February 25, 1903. Serial No. 144,929. (No model.)

*To all whom it may concern:*

Be it known that I, FRANK BATEMAN, a citizen of the United States, and a resident of Grenloch, Camden county, New Jersey, have invented certain Improvements in Cultivators, of which the following is a specification.

My invention relates to that class of cultivators which have gangs of cultivator-blades on opposite sides of the central longitudinal line of the machine, the object of my invention being to provide effective means for adjusting said gangs of blades laterally in respect to the line of the draft of the machine. This object I attain in the manner hereinafter set forth, reference being had to the accompanying drawings, in which—

Figure 1 is a view, partly in side elevation and partly in section, of sufficient of a cultivator to illustrate my present invention; and Fig. 2 is a perspective view illustrating the adjusting devices to which my invention relates.

In Fig. 1 of the drawings, 1 represents the axle of the machine, 2 one of the supporting-wheels therefor, and 3 one of the longitudinal beams of a fixed frame mounted upon the axle 1 by means of an interposed supporting structure 4 in the usual manner.

5 represents one of the frames carrying the bars upon which the gangs of cultivator-blades 6 are mounted, there being in the present instance two of these frames 5, one on each side of the machine, as shown in Fig. 2, each frame being rigidly secured at its forward end to a cross-head 7 and at its rear end to the blade-carrying bar 5ª. Each cross-head 7 is mounted so as to be capable of sliding laterally upon one of the horizontally-extending lower members 8 of a yoke 9, which is supported upon the beams 3 of the fixed frame by means of suitable clips 10 or in any other available manner, braces 11 serving to rigidly retain the lower portions of the yoke in proper fixed relation to said beams 3.

Each of the sliding cross-heads 7 has a loop 12, which is engaged by the lower end of a lever 13, these levers being hung to brackets 14, rigidly mounted upon the opposite depending legs of the yoke 8. The lever 13 at one side of the machine is connected, by means of a hook 15, to an eye 16 upon a block 17, which is secured to the forward end of a lever 18, the latter being pivotally mounted upon a bracket 19, secured to one of the beams 3 of the fixed frame of the cultivator, one portion of said bracket being formed as to constitute a toothed segment 20. The lever 13 on the other side of the machine is connected by a hook 21 to a bar 22, which extends transversely across the machine and is curved at its opposite end, so that it can either be connected to the lever 18 by a pin 23 at a point in the rear of the fulcrum of said lever, or it can be connected to the lever at a point in advance of its fulcrum by entering a pin 24 on the block 17 into any one of a series of openings 25, formed in said beam 22, the pin connection 23 in such case being removed.

In suitable lugs on the under side of the lever 18 is guided a bolt 26, which is adapted to engage with the toothed segment 20 of the bracket 19, so as to lock the lever 18 thereto in different positions of adjustment of said lever, said bolts 26 being connected by a rod 27 to an operating-lever 28, which is pivoted to the handle 29 of the lever 18 and can, if desired, be locked thereto by a pin inserted in the holes 30 in the handle and lever when it is desired to maintain the bolt 26 permanently out of engagement with the toothed segment 20. Supposing that the parts are in the position shown in Fig. 2, movement of the lever 18 in the direction of the arrow $x$ will cause movement of the levers 13 likewise in the direction of the arrows $x$, so as to move the cross-heads 7 toward each other, this reverse movement of the levers 13 being due to the fact that one of them is connected by the hook 15, eye 16, and block 17 to the lever 18 at a point in advance of the fulcrum of the same, while the other is connected by the hook 21 and curved bar 22 to said lever 18 at a point in the rear of the fulcrum, whereby movement of the lever 18 will necessarily cause movements of said levers 13 in opposite directions. When the lever 18 is moved in a direction the reverse of that indicated by the arrow $x$, the cross-heads 7 will be moved apart from each other. Hence the distance between the opposite gangs of cultivator-blades carried by the bars 5ª can be increased or diminished, as the exigencies of the work may require. If, on the other hand, the character of the work is likely to require the shifting of both of the opposite gangs of cultivator-blades simultaneously in one direction or the other, the pin 23 is removed and the bar 22 is coupled to the pin 24 of the block 17. Hence under these circumstances both levers 13 will be connected to the lever 18 at a point in advance of the fulcrum of the same, with the result that said levers 13 and the cross-heads engaged thereby will be moved simultaneously in the same direction when the lever 18 is operated.

Having thus described my invention, I claim and desire to secure by Letters Patent—

1. The combination in a cultivator, of bars located on opposite sides of the center of the machine and carrying cultivator-blades, a laterally-movable mounting for said bars, a single operating-lever, and connections between said operating-lever and the bars whereby movement of the lever may be caused to impart movement to the bars either in the same direction or in opposite directions, substantially as specified.

2. The combination in a cultivator, of bars located on opposite sides of the center of the machine, said bars carrying cultivator-blades, a laterally-movable mounting for said bars, a lever for operating the bars, and means for connecting both of said bars to said lever on the same side of the fulcrum of the latter, substantially as specified.

3. The combination in a cultivator, of bars located on opposite sides of the center of the machine, said bars carrying cultivator-blades, a laterally-sliding mounting for said bars, a hand-lever having a fixed fulcrum, and means for connecting said bars to said hand-lever, one on one side of the fulcrum of the same, and the other on the opposite side of said fulcrum, substantially as specified.

4. The combination in a cultivator, of bars located on opposite sides of the center of the machine, said bars carrying cultivator-blades, a laterally-movable mounting for said bars, a lever for operating the bars, means for connecting one of the bars to said lever on one side of the fulcrum of the latter, and means for connecting the other bar to said lever on either side of said fulcrum, substantially as specified.

5. The combination in a cultivator, of bars located on opposite sides of the center of the machine, said bars carrying cultivator-blades, opposite laterally-guided cross-heads to which said bars are connected, levers engaging said cross-heads, an operating-lever, and means for connecting said cross-head lever to said operating-levers, one on one side of the fulcrum of the same and the other on the opposite side of the fulcrum, substantially as specified.

6. The combination in a cultivator, of bars located on opposite sides of the center of the machine, said bars carrying cultivator-blades, opposite laterally-guided cross-heads to which said bars are connected, levers engaging said cross-heads, an operating-lever, means for connecting one of said cross-head levers to said operating-lever at a point on one side of the fulcrum of the same, and means for connecting the other cross-head lever to said operating-lever on either side of the fulcrum of the same, substantially as specified.

7. The combination in a cultivator, of bars located on opposite sides of the center of the machine, said bars carrying cultivator-blades, an operating-lever, and connections between the said lever and the bars, one of said connections being a bar with bent end having one portion for connection with the lever on one side of the fulcrum, and another portion for connection with the lever on the other side of said fulcrum, substantially as specified.

8. The combination in a cultivator, of bars located on opposite sides of the center of the machine, said bars carrying cultivator-blades, opposite cross-heads for the bars, lateral guides therefor, levers engaging said cross-heads, a main operating-lever having a block with projecting pin, a connection between said block and one of the cross-head levers, and a transverse bar connected to the other cross-head lever and having a curved or bent end, one portion of which is constructed for engagement with said pin on the block and the other portion for engagement with the lever on the other side of the fulcrum of the same, substantially as specified.

9. The combination of the bars located on opposite sides of the center of the machine, said bars carrying cultivator-blades, a laterally-movable mounting for said bars, an operating-lever for said bars, a lever-actuated bolt on said operating-lever, a toothed locking-segment for engagement with said bolt, and provision for securing said bolt-operating lever to the main lever when its bolt is withdrawn from engagement with the locking-segment, substantially as specified.

In testimony whereof I have signed my name to this specification in the presence of two subscribing witnesses.

FRANK BATEMAN.

Witnesses:
ELMER E. WILSON,
LILLIAN WEAVER.